(No Model.)  4 Sheets—Sheet 1.
A. MILLER.
MANURE SPREADER.
No. 366,675.  Patented July 19, 1887.
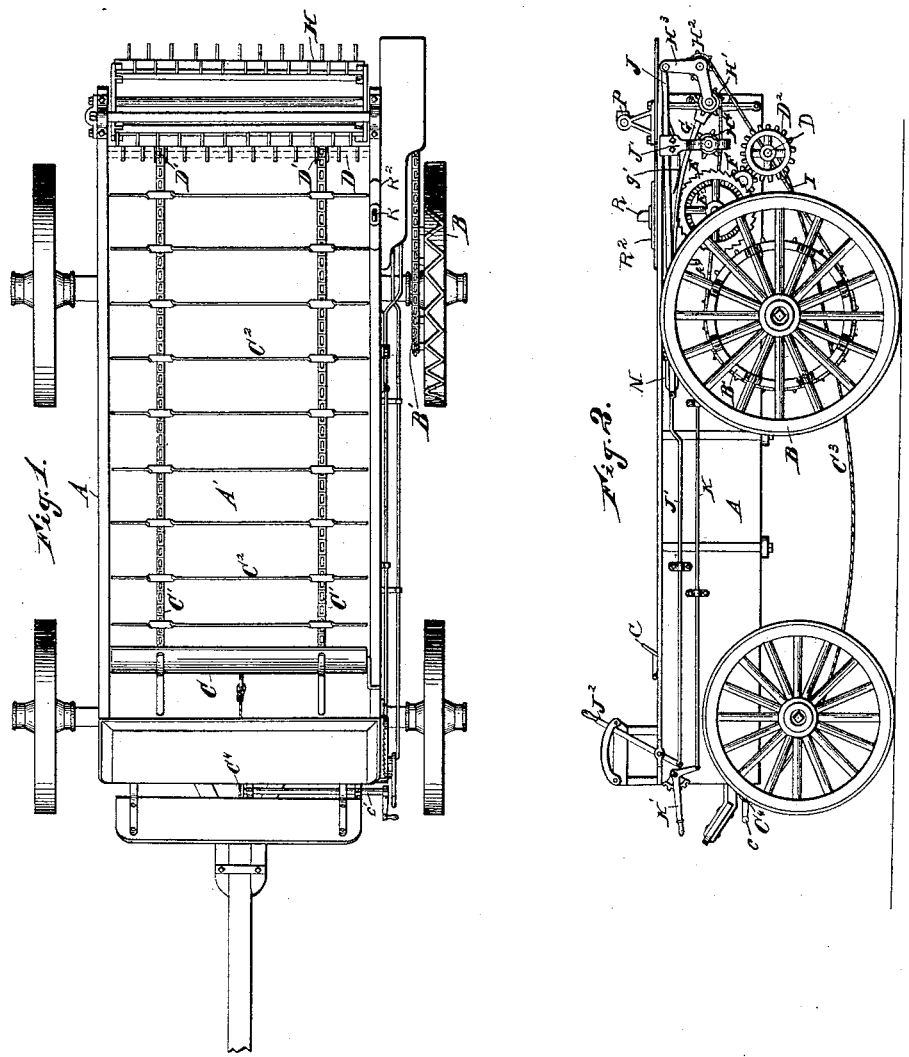
WITNESSES
John E. Wiles.
N. S. Wright.
INVENTOR
Abraham Miller
By W. W. Jeggett
Attorney (No Model.) 4 Sheets—Sheet 2.
A. MILLER.
MANURE SPREADER.
No. 366,675. Patented July 19, 1887.
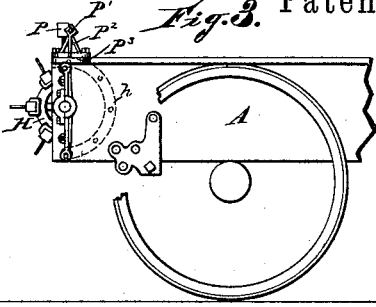
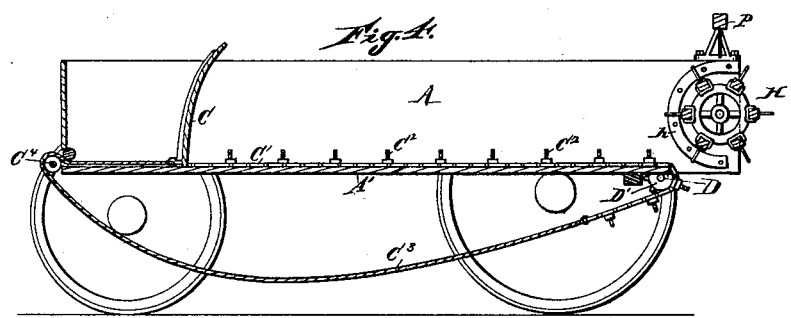
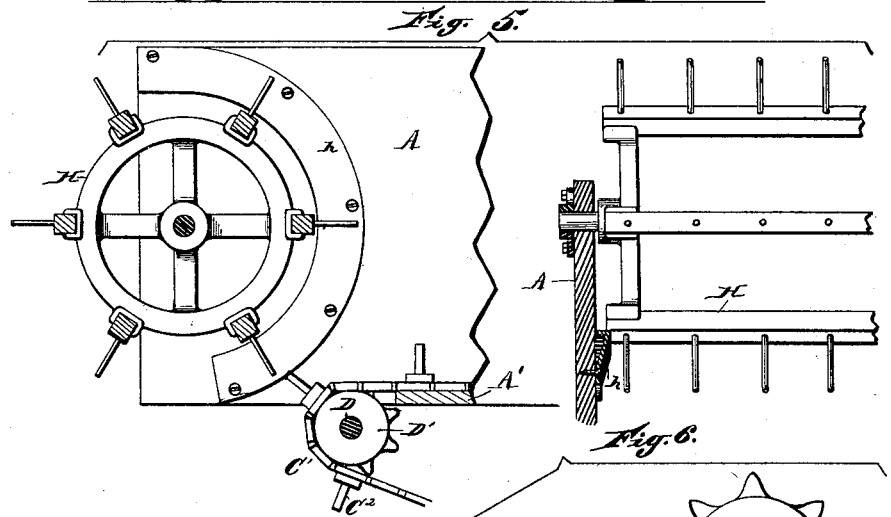
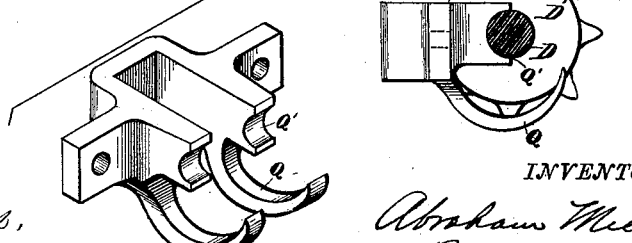
WITNESSES
John E. Wiles,
N. S. Wright.
INVENTOR
Abraham Miller
By W. W. Leggett
Attorney (No Model.) 4 Sheets—Sheet 3.
A. MILLER.
MANURE SPREADER.
No. 366,675. Patented July 19, 1887.
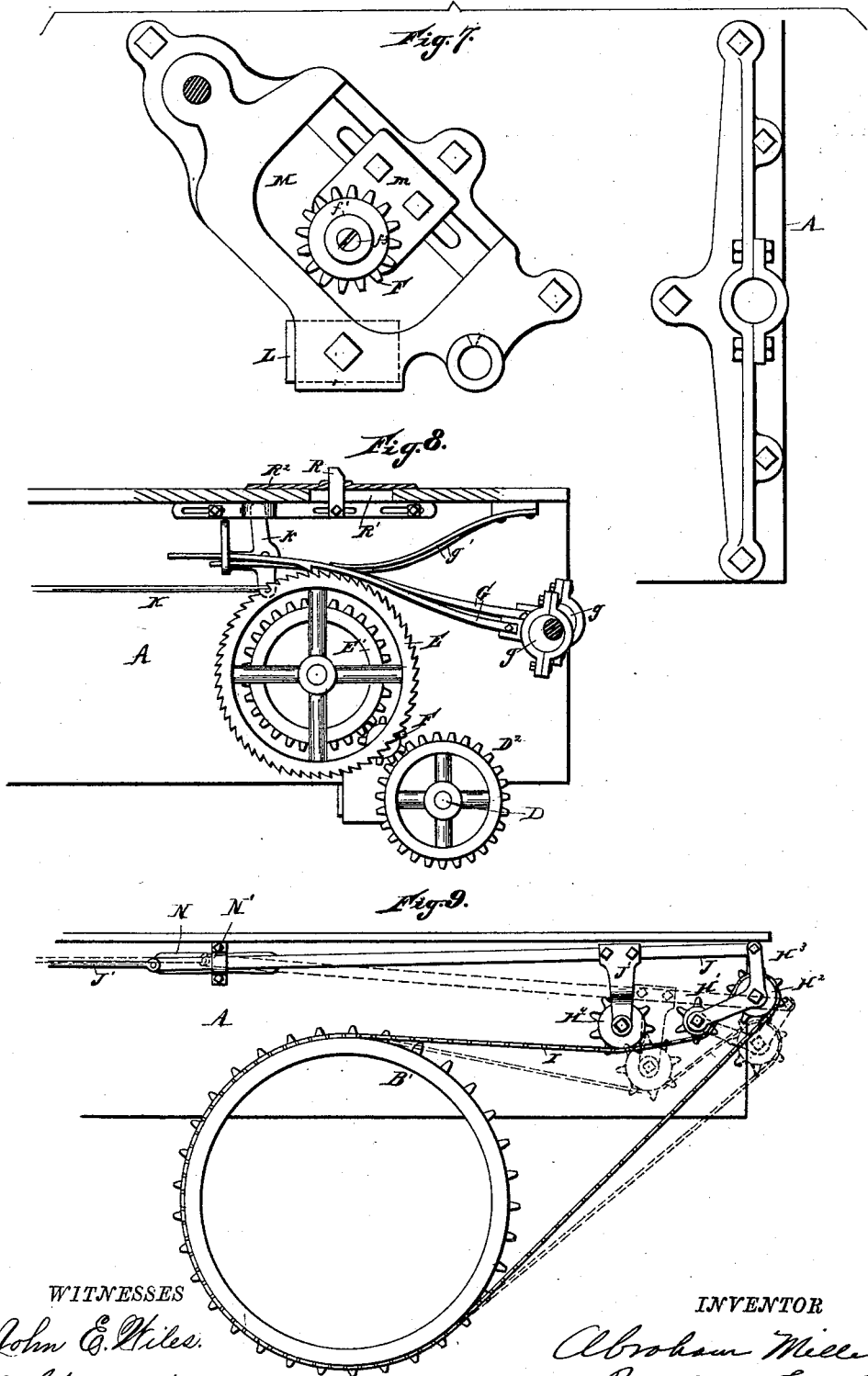

(No Model.) 4 Sheets—Sheet 4.

A. MILLER.
MANURE SPREADER.

No. 366,675. Patented July 19, 1887.

WITNESSES
John E. Wiles
N. S. Wright

INVENTOR
Abraham Miller
By W. W. Jaggers
Attorney

United States Patent Office.

ABRAHAM MILLER, OF NEWARK, ASSIGNOR TO THE NEWARK MACHINE COMPANY, OF COLUMBUS, OHIO.

MANURE-SPREADER.

SPECIFICATION forming part of Letters Patent No. 366,675, dated July 19, 1887.

Application filed January 24, 1887. Serial No. 225,345. (No model.)

*To all whom it may concern:*

Be it known that I, ABRAHAM MILLER, of Newark, county of Licking, State of Ohio, have invented a new and useful Improvement in Manure-Spreaders; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

Figure 10:
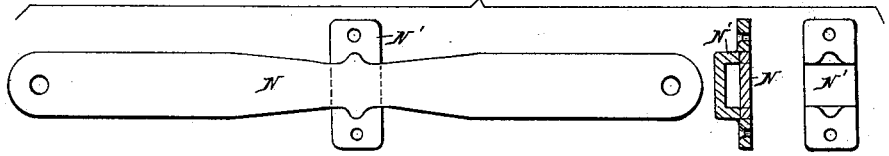
Figure 11:
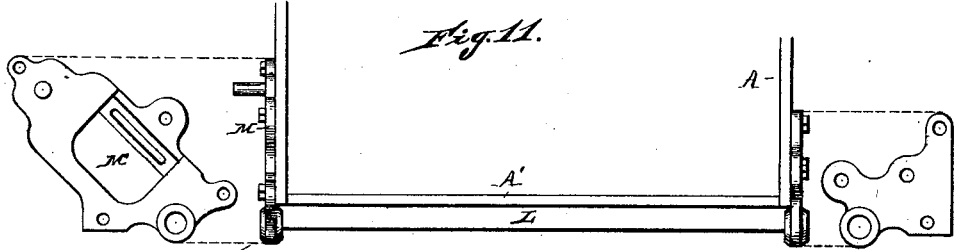
Figure 12:
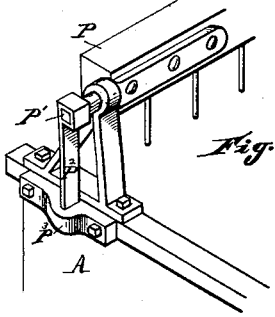
Figure 13:
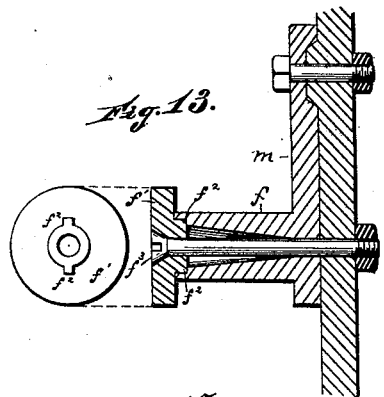
Figure 14:
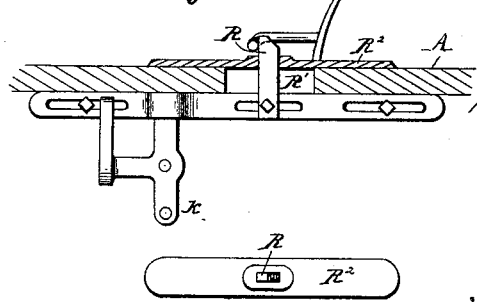
Figure 15:
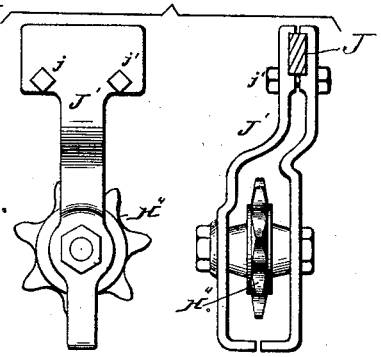

In the drawings, Figure 1 is a plan view of a manure-spreader embodying my invention. Fig. 2 is a side elevation of the same on the side where the power is taken from the wagon-wheel. Fig. 3 is a side elevation upon the opposite side of the machine. Fig. 4 is a longitudinal central section. Fig. 5 is a separate view illustrating the shield at the ends of the distributing reel or cylinder; Fig. 6, separate views showing how there is combined with each chain stripper a bearing for the feed-shaft and spoked wheel. Fig. 7 is a separate view showing the plate which bears the journal of the ratchet-wheel, the boxing of the feed-shaft pinion, and an intermediate adjustable gear-wheel for facilitating a change of feed, and showing at the end of the side-board of the wagon the journal-bearing of the distributing-cylinder. Fig. 8 is a separate view of the spring pawls and ratchet mechanism; Fig. 9, a separate view of the mechanism for throwing the distributing reel or cylinder in and out of gear; Fig. 10, a separate view of the guide-loop and guard shown at N N' in Fig. 9; Fig. 11, a separate view of the supporting cross-bar beneath the rear end of the wagon-body and its supporting end plates; Fig. 12, a separate view of the means for supporting the toothed detaining-bar above the distributing-cylinder and for giving to it a slightly-yielding spring movement. Fig. 13 is a sectional view of the stud for the pinion F; Fig. 14, a separate view of the mechanism whereby the scraper automatically, at the end of its travel, trips and throws out of gear the feeding-shaft, and showing the mortise-guard; Fig. 15, a separate view showing how the hanger is engaged to the shifting-bar.

My invention is designed as an improvement upon the device known as the "Johnston manure-spreader," Patent No. 325,249, of September 1, 1885.

My invention consists, essentially, first, in the means for engaging and disengaging the distributing reel or cylinder; second, in the mechanism for transmitting motion from the ratchet-wheel to the feed-shaft and for facilitating a change of the feed; third, in means for stiffening the rear end of the wagon and holding the sides of the wagon body or box always at right angles with the bottom of the box and in proper relation to the other mechanism; fourth, in means for stiffening the feed-shaft and preventing any springing of the same; fifth, in other special features of construction.

In carrying out my invention, A is the wagon-body of a manure-spreader. A' is its bottom.

B is a wheel, provided with a sprocket or chain gear, B', made, preferably, so that it can be detached—that is, so that it can be readily attached to the wheel of any farm-wagon.

C is a scraper. To this scraper are attached chains C', which pass over sprockets D' on the feed-shaft D. Drag-bars $C^2$ are arranged at intervals along the chains C', to assist in discharging the load. The free end of the chains is supported beneath the wagon by a chain or cable, $C^3$, which, passing forward to the front of the wagon, passes over a sprocket or pulley, $C^4$, and is engaged with the scraper C. A hand-crank, c, may be placed upon the arbor at the end of the shaft c', and by it the scraper is returned to the front of the wagon-box.

$D^2$ is the feed-shaft pinion. It is driven by the ratchet-wheel pinion E', secured to the ratchet E through the intermediate pinion, F. A couple of pawls, G, driven with an alternating movement by eccentrics $g$ on the shaft of the distributing-cylinder, serve to operate the ratchet-wheel, and so feed forward the scraper C.

H is the distributing reel or cylinder. At the extremity of its shaft is a sprocket-wheel, H'. An idle sprocket-wheel, $H^2$, is attached to an arm, $H^3$, which has a planetary motion around the wheel H'. A chain, I, connects the wheel H² with the sprocket-gear B' upon the wagon-wheel. A sliding or shifting bar, J, serves to rotate the wheel H² about the wheel H'. This bar J carries a hanger, J', which has at its lower end a sprocket-wheel, H⁴. When it is desired to engage the drive-wheel with the distributing reel or drum, a forward shift of the shifting-bar J lifts the arm H³, with its wheel H², and at the same time lifts the hanger J', so as to permit the chain I to engage the wheel H' and give rotation to the distributing-cylinder.

To disengage the cylinder H, the shifting-bar J is forced to the rear. This depresses the arm H³, with its wheel H², and also brings down the hanger J', and so releases the wheel H' from engagement with the chain, and the motion of the distributing-cylinder at once ceases. A lever, J², serves to actuate the shifting-bar J.

K is another shifting-bar, actuated by a lever, K'. It serves, through the medium of the levers k, to lift the pawls G out of engagement with the ratchet E, and so stop the feed-shaft D. In order that the pawls shall have a very positive action, I provide the springs g'—one for each pawl—which serve to hold them firmly into the ratchet. At each end of the distributing-cylinder, in order to overcome a difficulty which I have experienced caused by manure getting wedged in between the cylinder and the sides of the wagon-body, I have provided shields h, which, starting flush with the sides of the body, swell out and direct the manure free from the ends of the cylinder and cause it to operate freely at all times. I have also found difficulty from the yielding of the sides and bottom of the wagon-body at its rear end. Any yielding of the bottom distorts the relation of the body to the feed-shaft, and is apt to throw undue weight of material onto the shaft and disturb the proper movement of the scraper. Any distortion of the sides of the wagon-body is not only apt to bind the scraper so it cannot move, but, by throwing the sides out of parallelism with the drive-wheel, causes all the working mechanism to assume abnormal relations with each other, and results in faulty operation and the unnecessary expenditure of horse-power in propelling the machine. To overcome these difficulties, I provide a cross-piece, L, beneath the end of the wagon-body, and connect this at its ends with rigid metallic plates, as shown in Fig. 11. These plates stand at right angles to the bar and are fastened rigidly to the sides of the wagon-body, projecting well up along the sides to effect a thorough bracing of the same. I have experienced difficulty, also, because of the lack of rigidity between the ratchet-wheel and the parts which connect it with the feed-shaft. I have therefore provided a single metallic plate, M, to which all these parts are secured. The plate has upon it the ratchet-wheel shaft and the journal-box at the adjacent end of the feed-shaft. It also has upon it an adjustable plate, m, which carries the stud or shaft of the intermediate gear-wheel, F. This construction also admits of a ready adjustment to change the rate of feed. To change the feed, it is only necessary to change the pinions E' and D² by enlarging one and reducing the other. The same intermediate pinions F may then be employed by simply shifting the adjustable plate m.

I have found it desirable at times to shift the location of the hanger J' upon the shifting-bar. This may arise through variations in the length of the chain, or by reason of its having elongated by wear or by strain; or it may arise by reason of differences in construction of wagons upon which the apparatus is applied. I therefore prefer to make it adjustable on the shifting-bar. This may be accomplished in any convenient way; but the clamp-plate and binding-bolts shown in Fig. 15 at j and j' are effectual for the purpose.

The shifting-bar J, by its rising and falling and forward and back motions, is liable to create considerable wear on the side of the wagon-body, and might soon loose the guide loop or loops through which it passes. I have therefore provided a peculiar construction to overcome this difficulty, as shown in Fig. 10.

N is a wearing-plate separate from the loop, which is secured to the side of the wagon-body, and N' is an open loop, made to embrace the wearing-plate, and preferably seated in recesses in the edges of the plate. This loop is fastened by independent screws or bolts; but the wearing-plate prevents its displacement either up or down or in the direction of the length of the shifting-bar. The loop may be removed without disturbing the plate.

P is a detainer-bar provided with teeth. This is supported across the wagon-body above the distributing-cylinder. It may be either rigid or yielding. If rigid, it is supported at its ends by suitable standards, which will hold it rigid; or it may be permitted to yield slightly, and in that event I would provide it with a metallic arbor, P', at one end, entering a corresponding loop at the upper end of a spring-bar, P². The lower end of this spring-bar passes freely through a slot in the bracket P³ beneath, so that any rotation of the detainer-bar would be at once resisted by the spring, which would thereby be brought under tension.

The springing of the feed-shaft at the locations of the sprockets D' has been a great source of trouble. It has brought the sprockets into contact with the wooden body, and has caused the shaft D to bind in its boxes, and by the distortion of the shaft the drag-chains have been caused to work badly. I have found that by the location of bearing-blocks back of the shaft at these points and to partially embrace the same the difficulty is avoided. I have found it convenient, though this location is not essential, to combine such bearings with the strippers which are employed to detach the chain-links from the sprocket on the sprocket-wheels D'. Such a construction is shown in Fig. 6, in which Q are the strippers, and Q' the bearings for receiving the strain of and sustaining the feed-shaft.

The space usually present between a wagon-wheel and the side of the body is so small that it is difficult to properly adjust the working mechanism, and this is especially true of the intermediate pinion, F. To hold this pinion in place I therefore provide means as shown in Fig. 13. In this view, $f$ is the stud for the pinion F, and $f'$ a washer or head. This is notched to fit at corresponding projections on the stud, or vice versa, at $f^2$, so as to prevent it from turning, and the whole held in place by a screw, $f^3$. If desired, the journal-bearing may be made on the washer itself, which could then be replaced in case of wear. I prefer, however, the construction shown.

Difficulty has heretofore been experienced by the manure getting into the mortise in which travels the latch or stud, which is tripped by the scraper at the end of its stroke to automatically disengage the feed-shaft from the driving mechanism. To overcome this difficulty is the object of the device shown in Fig. 14. R is the latch or stud, and R' the slot or mortise in which it travels. In order to overcome the liability of clogging the mortise, I cover the slot with a plate, R², which has an opening through it only large enough for the passage of the stud or latch. It moves forward and back with the latch, and admits of any necessary play up and down through it of the stud R.

This apparatus is designed not only for application to the wagon-boxes and wheels of wagons made for the purpose, but also for ready attachment to any ordinary farm-wagon, which is ordinarily not sufficiently supported and broad. The parts are all, therefore, so constructed that when regularly attached the wagon is thereby suitably braced and the whole converted into a substantial manure-spreader embodying all the advantages of my improvements.

C² represents cross-pieces or drag-bars, which extend across the bottom of the wagon and connect the two drag-chains. Their function is to assist in dragging the manure toward the discharge end of the machine. They are made of metal, preferably wrought-iron bars turned up edgewise. There is a great advantage in bars of metal of this character extending across from side to side of the wagon-body. They give to the operation of the machine a certain rigidity, and the parts are so held in a proper relation that a positiveness of action is assured beyond what may be readily attained by slats extending part way across. So, also, by making them of narrow metal bars, sufficient strength and stiffness is attained by a small bar, and this can, at the feed-shaft, pass down through a smaller orifice, and so leave the minimum of opening between the end of the wagon and the teeth of the distributing-cylinder. This reduces the chances of escape of manure beneath the said cylinder.

What I claim is—

1. In a manure-spreader, the combination, with the wagon-body and distributing-cylinder, of shields attached to the body at the ends of the cylinder and adapted to deflect the manure and prevent its interposition between the ends of the cylinder and wagon-sides, substantially as and for the purpose set forth.

2. In a manure-spreader, the combination, with the feed-shaft, of bearings adjacent to the sprockets over which the drag-chains pass, whereby the said shaft is supported against lateral strain, substantially as and for the purposes described.

3. In a manure-spreader, the combination, with the feed-shaft, of bearings adjacent to the sprockets over which the drag-chains pass, said bearings made to partially embrace the shaft, substantially as and for the purposes described.

4. In a manure-spreader, the combination, with the feed-shaft, of bearings adjacent to the sprocket over which the drag-chains pass, said bearings connected with and forming a part of the strippers which disengage the links from the sprockets, substantially as and for the purposes described.

5. In a manure-spreader, the combination, with the wagon-box, of a cross-piece beneath its rear end and metallic plates at its ends at right angles to the said cross-piece, fastened rigidly thereto and extending up along and securely fastened to the sides of the box, the construction being such that the sides and bottom of the wagon-box are held rigidly and at right angles with each other, substantially as and for the purposes described.

6. In a manure-spreader, the combination, with the wagon-box, of a cross-piece beneath its rear end, rigid plates fastened to the said cross-piece and wagon-sides, adapted to hold them always at right angles with each other, mechanism fastened to the side of the box for operating the feed-shaft and distributing-cylinder, a sprocket-gear connected with the wagon-wheel, and a driving-chain, the construction being such, substantially as described, that the entire operative parts are always held in a normal and unchangeable relation with each other.

7. In a manure-spreader, means for engaging and disengaging the distributing-cylinders from the drive mechanism, consisting, essentially, of the combination, with the drive wheel and chain, of the cylinder-pulley H' and the pulleys H² and H⁴, arranged with relation to the drive-chain substantially as shown, and means for shifting said pulleys H² and H⁴ to engage or disengage the chain from the cylinder-pulley, essentially as described, and for the purposes set forth.

8. In a manure-spreader, the gear-wheels E' D² and intermediate pinion, F, all engaged with and supported by the same metallic bed-plate, said pinion F supported directly by a plate made adjustable on the bed-plate, whereby it may be shifted when the other pulleys are changed to vary the feed, substantially as described.

9. The bed-plate M, provided with a stud or journal for the wheel E' and ratchet-wheel, and a boxing for the feed-shaft, and provided with a shifting-plate bearing the journal of the intermediate gear, F, said shifting-plate adjustably secured to the bed-plate M by a slot-and-bolt connection, substantially as described.

10. The combination, with the shifting-bar J, of the wearing-plate N and open loop N', substantially as and for the purposes described.

11. The combination of the pawls G, the lever $k$, and the stud R, connected to the said lever, and operated substantially as described.

12. The combination, with the intermediate gear, F, of the head or washer recessed into its side, the same engaged by a notch or projection with the journal-stud, and fastened in place with a screw, substantially as described.

13. The combination, with the stud R and mortise R', of the covering-plate $R^2$, adapted to slip over and move with the stud, substantially as described.

In testimony whereof I sign this specification in the presence of two witnesses.

ABRAHAM MILLER.

Witnesses:
RICHD. T. CLARKE,
H. B. WHITE.